(12) United States Patent
Ho

(10) Patent No.: US 10,334,928 B1
(45) Date of Patent: Jul. 2, 2019

(54) CONTAINER FOR MOBILE DEVICE

(71) Applicant: Oxti Corporation, Taipei (TW)

(72) Inventor: Chih Feng Ho, Taipei (TW)

(73) Assignee: Zgonic Pty Ltd., Victoria (AU)

(*) Notice: Subject to any disclaimer, the term of this patent is extended or adjusted under 35 U.S.C. 154(b) by 0 days.

(21) Appl. No.: 15/944,823

(22) Filed: Apr. 4, 2018

(51) Int. Cl.
*H05K 5/00* (2006.01)
*H05K 7/00* (2006.01)
*A45C 15/00* (2006.01)
*A45C 11/00* (2006.01)
*A45C 13/00* (2006.01)
*G06F 1/16* (2006.01)
*A45C 13/10* (2006.01)

(52) U.S. Cl.
CPC .............. *A45C 15/00* (2013.01); *A45C 11/00* (2013.01); *A45C 13/005* (2013.01); *A45C 13/10* (2013.01); *G06F 1/1616* (2013.01); *G06F 1/1656* (2013.01); *A45C 2011/003* (2013.01); *A45C 2200/15* (2013.01)

(58) Field of Classification Search
CPC ....................................................... H05K 5/00
See application file for complete search history.

(56) References Cited

U.S. PATENT DOCUMENTS

2005/0206615 A1\* 9/2005 Tanimoto .............. G06F 1/1616
345/156

\* cited by examiner

*Primary Examiner* — Jerry Wu
(74) *Attorney, Agent, or Firm* — Charles E. Baxley

(57) ABSTRACT

A container includes a housing having a base wall and an upper wall, and the housing includes a cover panel extended from the upper wall and foldable relative to the upper wall and movable toward the upper wall, a base plate is engaged in the housing, a support device is foldably attached to the base plate with a hinge device, and the support device is foldable relative to the base plate and the housing, and a display is attached to the support device and movable relative to the upper wall between an upwardly working position and a downwardly folded storing position. The housing includes a chamber formed by a base wall and the upper wall for receiving a mobile device.

2 Claims, 5 Drawing Sheets

CONTAINER FOR MOBILE DEVICE

BACKGROUND OF THE INVENTION

1. Field of the Invention

The present invention relates to a package or container for displayer or mobile device, and more particularly to a package or container for accommodating or receiving a displayer or a mobile device, such as a tablet, a laptop, a notebook, etc., including an improved and simplified structure or configuration for accommodating or receiving the displayer or the mobile device or the like.

2. Description of the Prior Art

Typical mobile devices, such as tablets, laptops, notebooks, etc., may normally be accommodated or received or contained within a fold or package which comprises a base and a cover foldable relative to each other.

However, the fold or package may not be used for accommodating or receiving the other displayers or mobile devices or the like.

The present invention has arisen to mitigate and/or obviate the afore-described disadvantages of the conventional container for mobile devices.

SUMMARY OF THE INVENTION

The primary objective of the present invention is to provide a package or container for accommodating or receiving a displayer or a mobile device, such as a tablet, a laptop, a notebook, etc., including an improved and simplified structure or configuration for accommodating or receiving the displayer or the mobile device or the like.

In accordance with one aspect of the invention, there is provided a container comprising a housing including a base wall and an upper wall, and the housing including a cover panel extended from the upper wall and foldable relative to the upper wall and movable toward the upper wall, a base plate engaged in the housing, a support device foldably attached to the base plate with a hinge device, and the support device being foldable relative to the base plate and the housing, and a display attached to the support device and movable relative to the upper wall between an upwardly working position and a downwardly folded storing position.

The housing includes a chamber formed therein and defined by a base wall and the upper wall. A mobile device may further be provided and selectively receiveable and engageable into the chamber of the housing. A connecting cable may further be provided and electrically connectable to the display and the mobile device. The base plate is engaged in the base wall of the housing.

The housing includes a flap extended from the base wall and foldable relative to the base wall for covering the chamber of the housing selectively. The housing includes a lock device attached to the cover panel, and a lock member attached to the flap for selectively engaging with the lock device of the cover panel and for coupling the cover panel and the flap together.

The housing includes a depression formed in the upper wall for selectively receiving and engaging with the display when the cover panel is folded toward the upper wall.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
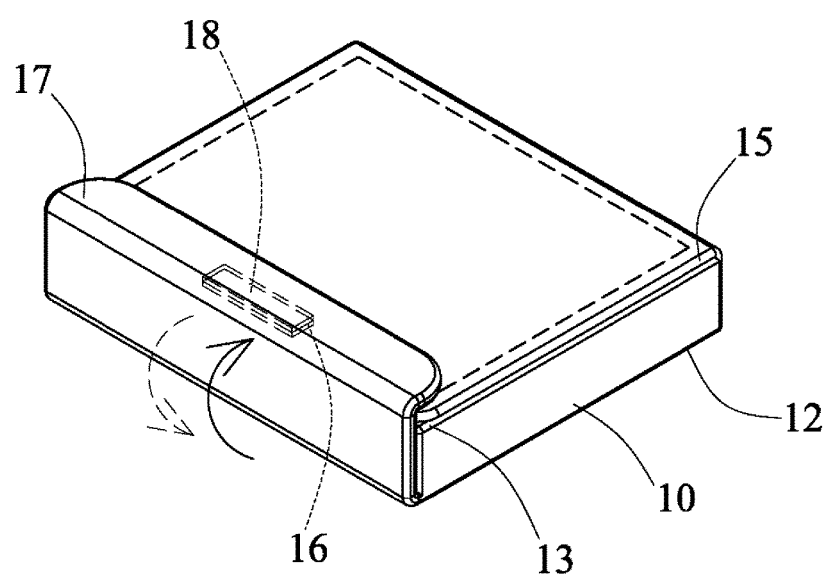
FIG. 1 is a perspective view of a container for mobile device in accordance with the present invention.

Referring to the drawings, and initially to FIGS. 1-5, a container for mobile device in accordance with the present invention comprises a container body or housing 10 including a compartment or chamber 11 formed therein and formed or defined by a bottom or base wall 12 and an upper wall 13, and including a recess or depression 14 formed in the upper wall 13, the depression 14 that is formed in the upper wall 13 may be communicated with or spaced or separated from the chamber 11 of the housing 10. The housing 10 includes a cover panel 15 hinged or extended from the base wall 12 and/or the upper wall 13 and foldable relative to the upper wall 13 and/or foldable or movable toward the upper wall 13 (FIG. 6) for covering the depression 14 of the upper wall 13 of the housing 10 selectively.

The housing 10 further includes a lock device 16, such as a Velcro, a magic sticker or the like attached or mounted or secured to the cover panel 15, and further includes another fold or flap 17 hinged or extended from the base wall 12 and foldable relative to the base wall 12 and/or the upper wall 13, for covering the chamber 11 of the housing 10 selectively (FIG. 1). The housing 10 further includes another lock device or lock member 18, such as a Velcro, a magic sticker or the like attached or mounted or secured to the flap 17, for selectively engaging with the lock device 16 of the cover panel 15 (FIG. 1), and for solidly and stably securing or coupling the cover panel 15 and the flap 17 together. The chamber 11 of the housing 10 may be provided for accommodating or receiving or containing a mobile device 20 (FIGS. 5-7), such as a tablet, a laptop, a notebook, or the like.

Figure 2:
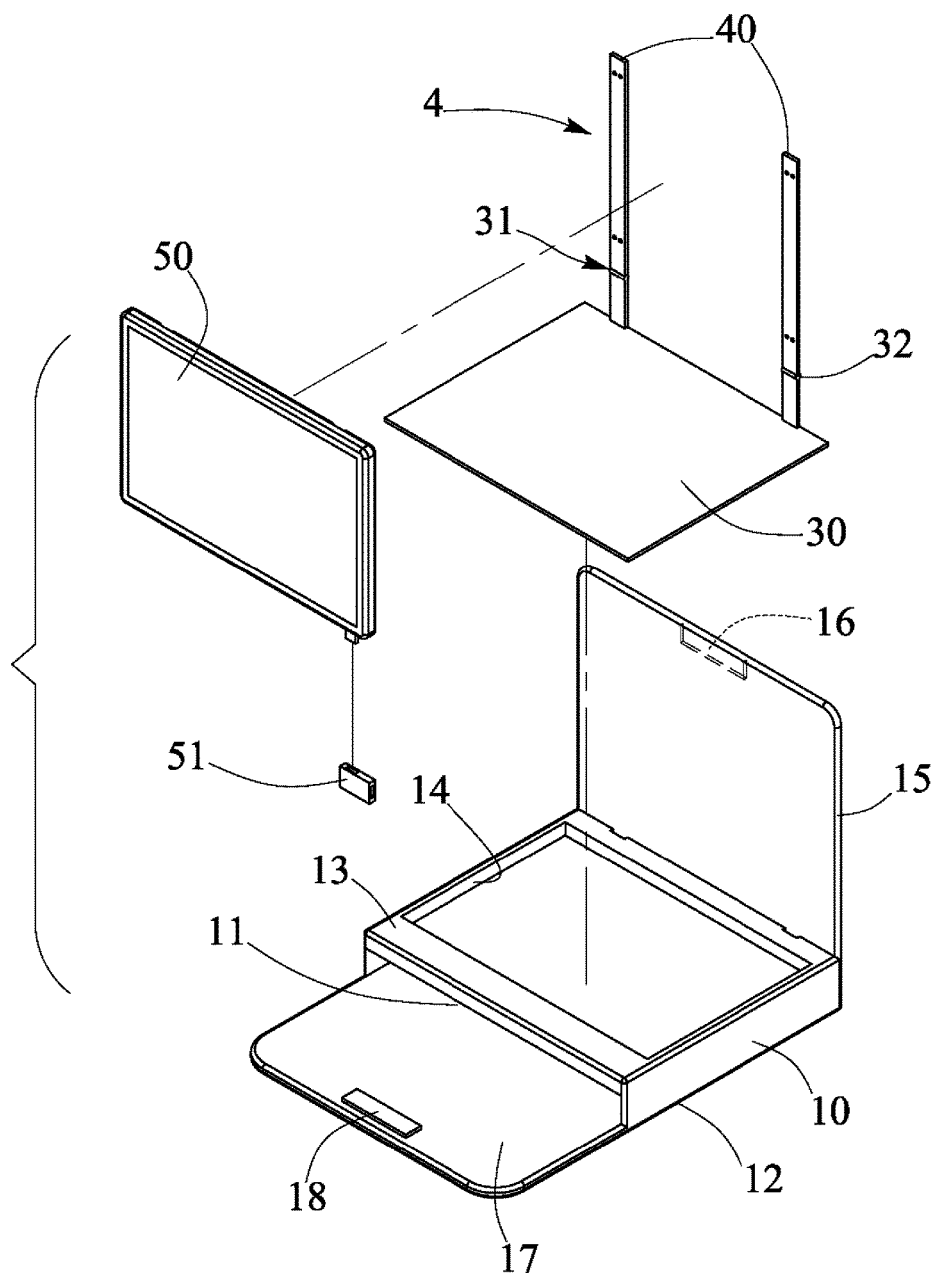
FIG. 2 is a partial exploded view of the container for mobile device.
Figure 3:
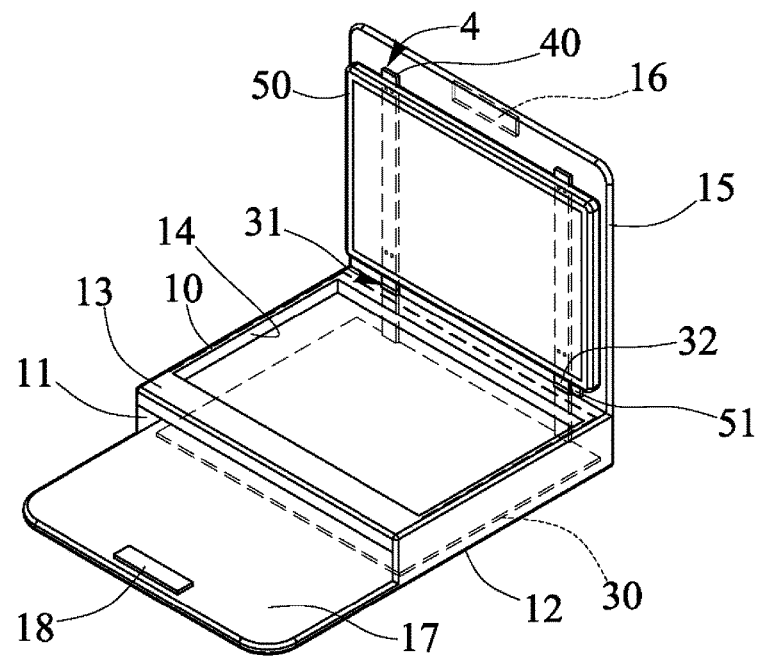
FIG. 3 is a perspective view illustrating the operation of the container for mobile device.
Figure 4:
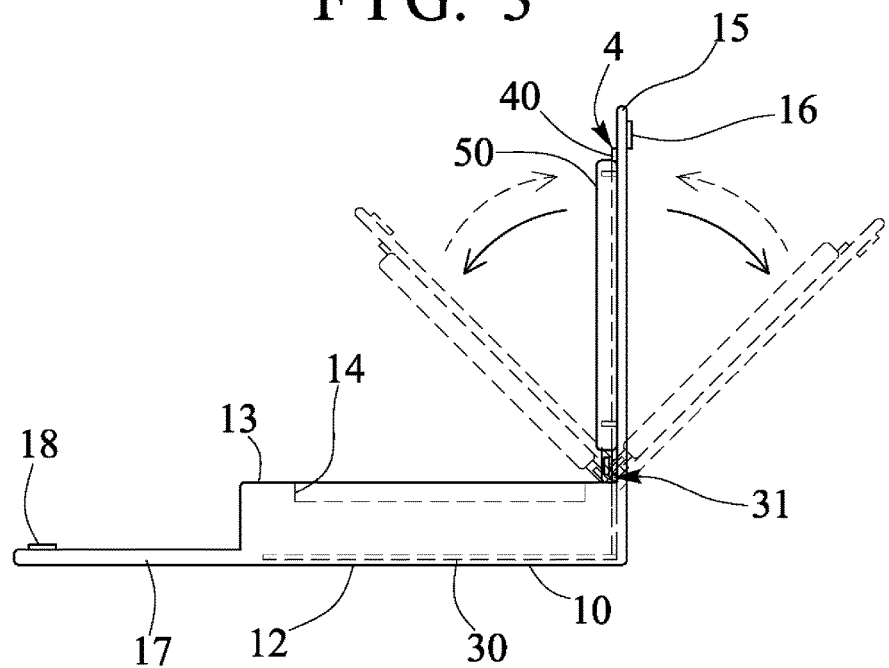
FIG. 4 is a side plan schematic view of the container for mobile device as shown in FIG. 3.

As shown in FIGS. 2-4, a weight member of base plate 30 is received or engaged into the base wall 12 of the housing 10, and disposed or located below the chamber 11 of the housing 10, a support device 4 is foldably attached or mounted or secured to the base plate 30 with a pivot or hinge device 31 and foldable relative to the base plate 30, for example, the support device 4 includes one or more (such as two) stays 40 each pivotly or foldably attached or mounted or secured to the base plate 30 with a hinge member 32 and foldable relative to the base plate 30 (FIG. 4), the stays 40 of the support device 4 are contacted or engaged or attached or mounted or secured to the cover panel 15 and foldable or movable in concert with the cover panel 15 relative to the base plate 30 and the base wall 12 and/or the upper wall 13.

Figure 5:
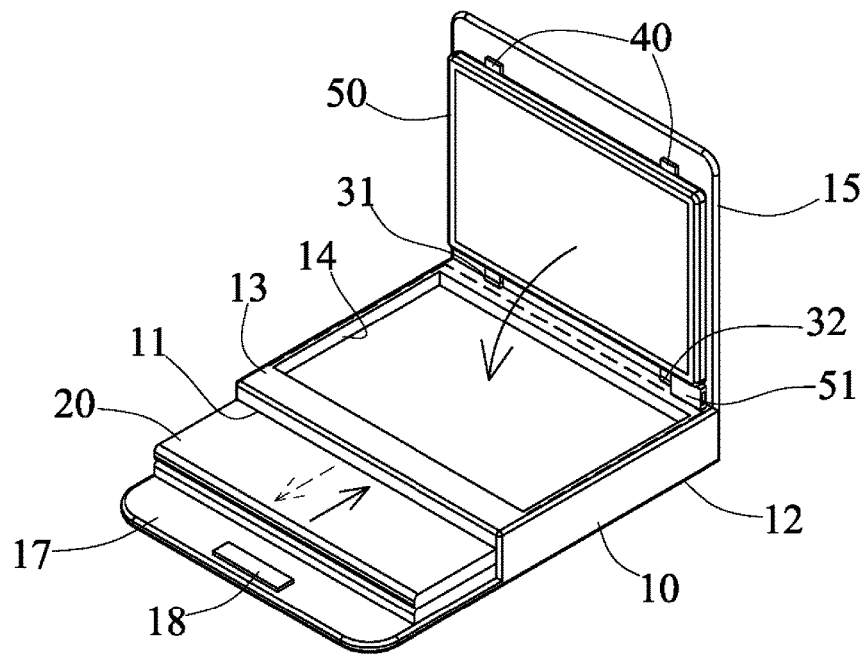
FIGS. 5, 6, 7 are perspective views illustrating the operation of the container for mobile device.
Figure 6:
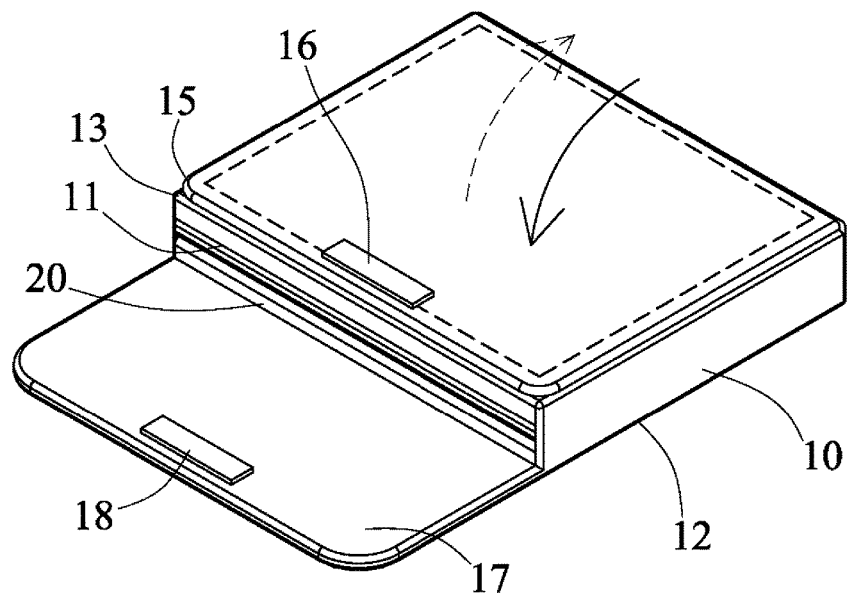
Figure 7:
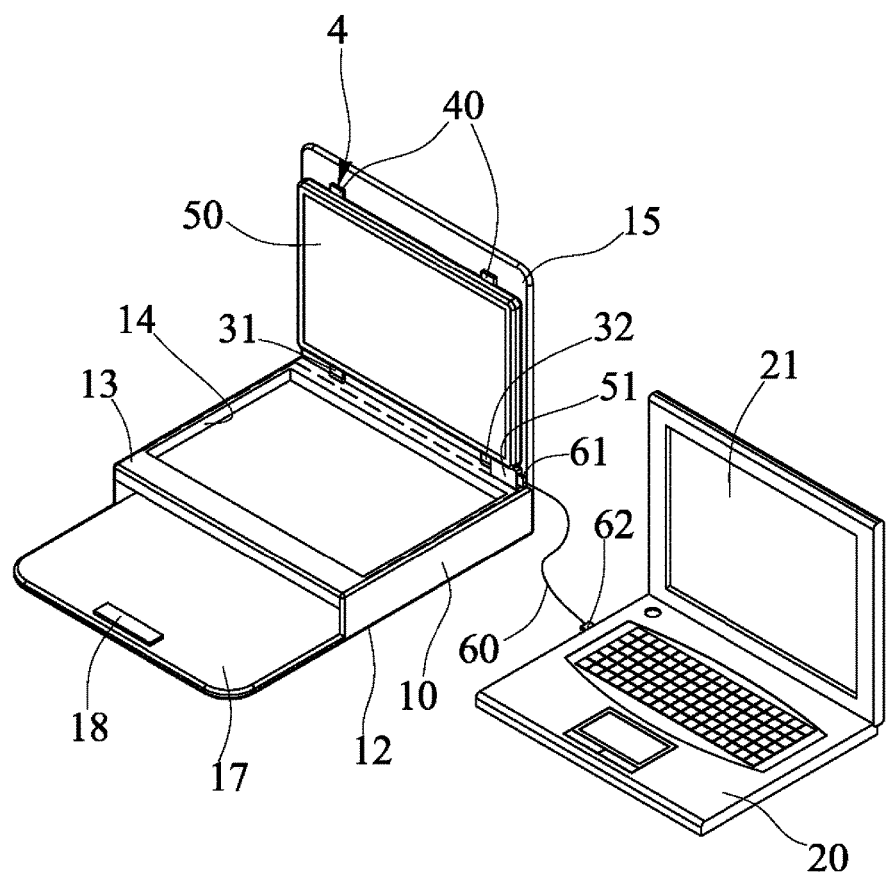

A screen or display 50 is attached or mounted or secured to the stays 40 of the support device 4 and foldable or movable relative to the base wall 12 and/or the upper wall 13 between an upwardly opening or working position as shown in FIGS. 3, 5, 7, and a downwardly folded storing position as shown in FIGS. 1 and 6. It is preferable that the display 50 is received or engaged into the depression 14 of the upper wall 13 of the housing 10 when the cover panel 15 and the stays 40 of the support device 4 are folded or moved toward the upper wall 13. When or after the mobile device 20 is received or engaged into the chamber 11 of the housing 10 and when the cover panel 15 and the stays 40 of the support device 4 are folded or moved toward the upper wall 13, the flap 17 may be folded relative to the base wall 12 and/or the upper wall 13, and the lock member 18 of the flap 17 may be engaged with the lock device 16 of the cover panel 15 (FIG. 1), for solidly and stably securing or coupling the cover panel 15 and the flap 17 together and for solidly and stably anchoring or retaining the mobile device 20 within the chamber 11 of the housing 10.

As shown in FIG. 7, when the mobile device 20 is removed or disengaged from the chamber 11 of the housing 10, the mobile device 20 may be electrically connected or coupled to the terminal or connecter 51 of the display 50 with a connecting cable 60 and one or more connecters or couplers 61, 62, for allowing the information of the mobile device 20 to be shown in either or both the display 50 and the screen 21 of the mobile device 20.

In operation, as shown in FIGS. 3-5 and 7, the display 50 and the cover panel 15 and the stays 40 of the support device 4 may be folded relative to the base wall 12 and/or the upper wall 13 upwardly toward the opening or working position for allowing the display 50 reached or operated by the user. After use, the display 50 and the cover panel 15 and the stays 40 of the support device 4 may be folded relative to the base wall 12 and/or the upper wall 13 downwardly toward the upper wall 13 to the folded storing position as shown in FIGS. 1 and 6, for allowing the display 50 to be received or engaged into the depression 14 of the upper wall 13 of the housing 10. After the mobile device 20 is received or engaged into the chamber 11 of the housing 10, the flap 17 may be folded relative to the base wall 12 and/or the upper wall 13, and the lock member 18 of the flap 17 may be engaged with the lock device 16 of the cover panel 15 (FIG. 1), for solidly and stably securing or coupling the cover panel 15 and the flap 17 together and for solidly and stably anchoring or retaining the mobile device 20 within the chamber 11 of the housing 10.

Accordingly, the package or container for mobile device in accordance with the present invention includes an improved and simplified structure or configuration for accommodating or receiving the displayer or the mobile device or the like.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A container comprising: a housing including a chamber with a side opening formed in said housing and defined by a base wall and an upper wall, and said housing including a cover panel extended from said upper wall and foldable relative to said upper wall and movable toward said upper wall, said housing including a flap extended from said base wall and foldable relative to said base wall for covering the side opening of said chamber of said housing selectively, and said housing including a depression formed in said upper wall, a lock device attached to said cover panel, a lock member attached to said flap for selectively engaging with said lock device of said cover panel and for coupling said cover panel and said flap together, a mobile device selectively receiveable and engageable into said chamber of said housing through the side opening, a base plate engaged in said base wall of said housing, a support device foldably attached to said base plate with a hinge device, and said support device being foldable relative to said base plate and said housing, and a display attached to said support device and movable relative to said upper wall between an upwardly working position and a downwardly folded storing position, and said display being selectively receivable and engageable in said depression which is formed in said upper wall of said housing when said cover panel is folded toward said upper wall.

2. The container as claimed in claim 1, wherein a connecting cable is electrically connectable to said display and said mobile device.

* * * * *